United States Patent
Eslambolchi et al.

(10) Patent No.: US 7,353,231 B1
(45) Date of Patent: Apr. 1, 2008

(54) FLIP-FLAP MECHANISM FOR HIGH AVAILABILITY, ONLINE ANALYTICAL PROCESSING DATABASES

(75) Inventors: Hossein Eslambolchi, Los Altos Hills, CA (US); John McCanuel, Bailey, CO (US); Prakash Vasa, Clarksburg, NJ (US)

(73) Assignee: AT&T Corp., New York, NY (US)

( * ) Notice: Subject to any disclaimer, the term of this patent is extended or adjusted under 35 U.S.C. 154(b) by 303 days.

(21) Appl. No.: 11/256,526

(22) Filed: Oct. 21, 2005

(51) Int. Cl.
  G06F 17/30 (2006.01)
  G06F 7/00 (2006.01)
  G06F 12/00 (2006.01)

(52) U.S. Cl. ............... 707/10; 707/3; 707/200; 707/203

(58) Field of Classification Search ............ 707/3, 707/10, 200, 203
See application file for complete search history.

(56) References Cited

U.S. PATENT DOCUMENTS 5,873,088 A * 2/1999 Hayashi et al. .......... 707/100
2005/0055385 A1* 3/2005 Sinha et al. ............ 707/203

OTHER PUBLICATIONS

"Oracle Use of Synonyms", Experts-Exchange, http://www.experts-exchange.com/Database/Oracle/Q_21599303.html.*
Richard Holowczak, "Oracle SQL Plus: An Introduction and Tutorial", http://cisnet.baruch.cuny.edu/holowczak/oracle/sqlplus/, pp. 28-29.*

* cited by examiner

Primary Examiner—Ramesh B. Patel
Assistant Examiner—Brannon W Smith
(74) Attorney, Agent, or Firm—Hoffman & Baron, LLP

(57) ABSTRACT

A method for maintaining high availability for an on-line database which includes: creating a first user account having a plurality of first tables and first schema objects; creating a second user account having a plurality of second tables and second schema objects; creating a third user account having a first set of synonyms for the first tables and first schema objects; creating a fourth user account having a second set of synonyms for the second tables; accessing the first user account using the first set of synonyms; modifying data using the second set of synonyms into the second user account to provide a plurality of revised second tables and revised second schema objects; dropping the first set of synonyms; creating a third set of synonyms in the third user account for the plurality of revised second tables and revised second schema objects; and accessing the second user account using the third set of synonyms.

20 Claims, 2 Drawing Sheets

FLIP-FLAP MECHANISM FOR HIGH AVAILABILITY, ONLINE ANALYTICAL PROCESSING DATABASES

BACKGROUND OF INVENTION

The present invention relates generally to a method for maintaining a high availability for on-line databases and, more particularly, to a method for maintaining a high availability for on-line analytical processing databases.

Modern businesses have become increasingly reliant on computer systems and require databases that are available 7×24 (i.e., 7 days a week, 24 hours a day). Communication networks, credit card companies, airlines, financial institutions and a host of other industries operate around the clock and cannot afford to take their databases off-line for updating. For example, credit card companies must update their databases to reflect transactions that affect the customers credit limit and available funds. The database must be updated each day as new charges and payments are made without making the database unavailable for customers to access their accounts via telephone or the Internet. Similarly, communication networks must maintain an up-to-date and accurate records of customer usage and cannot afford downtime for updating the database.

Large business organizations are experiencing increased processing times and downtimes for their databases, and most importantly for their on-line analytical processing ("OLAP") databases, as the amount of enterprise data has increased. In many organizations, the processing times and downtimes have increased to the point where they threaten the day-to-day operations of the business. Increased processing time causes delays in accessing and updating information and result in a general reduction in efficiency and productivity. Moreover, more frequent and longer database downtimes are a great inconvenience to users and disrupt daily activities and the transaction of business.

The continuous use of databases, and in particular the critical nature of OLAP databases, has created a need for databases that are available 7×24 and do not require regularly scheduled downtime for updating. The databases that are presently being used do not satisfy these requirements. Therefore, there is a need for a database that is available on a substantially continuous basis (i.e., 7×24) and can be updated without any significant downtime.

SUMMARY OF THE INVENTION

In accordance with the present invention, a method for maintaining high availability for an on-line database, preferably an on-line analytical processing database, is provided. The method includes: providing access to data in a first user account using a first set of synonyms; modifying data in a second user account using a second set of synonyms; generating a third set of synonyms associated with the second user account; dropping the first set of synonyms; providing access to data in the second user account using the third set of synonyms; dropping the second set of synonyms; generating a fourth set of synonyms associated with the first user account; and modifying data in the first user account using the fourth set of synonyms. The data in the first user account represents a different version of the data in the second user account. Preferably, the first set of synonyms and third set of synonyms support schema access for user read only queries and the second set of synonyms and the fourth set of synonyms support ETL (extract transform and load) data loading utilities.

Another preferred method of the present invention includes: creating a first user account comprising a plurality of first tables and a plurality of first schema objects; creating a second user account comprising a plurality of second tables and a plurality of second schema objects; creating a third user account comprising a first set of synonyms for the plurality of first tables and the plurality of first schema objects; creating a fourth user account comprising a second set of synonyms for the plurality of second tables; accessing the first user account using the first set of synonyms; modifying data using the second set of synonyms into the second user account to provide a plurality of revised tables and a plurality of revised second schema objects; dropping the first set of synonyms; creating a third set of synonyms in the third user account for the plurality of revised tables and the plurality of revised second schema objects; and accessing the second user account using the third set of synonyms.

The method can include truncating the plurality of first tables owned by the first user account after the first set of synonyms is dropped. The method can also include: dropping the second set of synonyms; and creating a fourth set of synonyms in the fourth user account for the plurality of first tables. In preferred embodiments, the method further includes: modifying data using the fourth set of synonyms into the first user account to provide a plurality of revised first tables and a plurality of revised first schema objects; dropping the third set of synonyms; creating a fifth set of synonyms in the third user account for the plurality of revised first tables and the plurality of revised first schema objects; and accessing the first user account using the fifth set of synonyms. In addition, the method can include confirming that the data modifying using the fourth set of synonyms is completed before accessing the first user account using the fifth set of synonyms and truncating the plurality of second tables after the third set of synonyms is dropped.

Preferably, the method confirms that the modifying of the second set of synonyms is completed before accessing the second user account using the third set of synonyms. In preferred embodiments, a table in the first user account tracks the dropping of groups of synonyms. By the method, the third user account provides substantially continuous access to the first user account or the second user account. In other embodiments, the first user account also includes a plurality of first views and a plurality of first sequences and the second user account also includes a plurality of second views and a plurality of second sequences. In preferred embodiments, the first set of synonyms and third set of synonyms support schema access for user read only queries and the second set of synonyms supports ETL (extract transform and load) data loading utilities.

The user accounts can be in one or more databases, preferably one or more on-line analytical processing databases. In a preferred embodiment, each of the first, second, third and fourth user accounts is in one or more databases. In another preferred embodiment, the first user account is in a first group of one or more databases and the second user account is in a second group of one or more databases.

The preferred embodiments of the method for maintaining high availability for an on-line database of the present invention, as well as other objects, features and advantages of this invention, will be apparent from the following detailed description, which is to be read in conjunction with the accompanying drawings.

BRIEF DESCRIPTION OF THE FIGURES

Other objects and many attendant features of this invention will be readily appreciated as the invention becomes better understood by reference to the following detailed description when considered in connection with the accompanying drawings wherein.

DETAILED DESCRIPTION OF THE INVENTION

The present invention is a method for maintaining high availability for an on-line database, preferably an on-line analytical processing database, which uses a "flip-flap" database mechanism. This flip-flap mechanism is extremely useful for on-line databases, in particular OLAP databases, where there is a large amount of data being refreshed in the database in a limited interval of time. The method prevents any significant down-time for the on-line database and thereby supports a continuous 7 day×24 hour operational model. The method of the present invention employs a mechanism to provide a secondary schema for the primary database in real time and, at the same time, completes the loading or modifying process into the secondary schema. After the data load is successfully completed, the control is moved to the secondary schema from the primary as part of the clean-up mechanism. This results in the client experiencing a negligible amount of downtime.

The present invention is especially useful for on-line analytical processing databases (OLAP). In general terms, OLAP is a category of software tools that provides analysis of data stored in a database. OLAP tools enable users to analyze different dimensions of multidimensional data. For example, it provides time series and trend analysis views. In addition, OLAP often is used in data mining. The chief component of OLAP is the OLAP server, which is located between a client and a database management system ("DBMS"). The OLAP server supervises how data is organized in the database and has special functions for analyzing the data. There are OLAP servers available for nearly all commercially available database systems.

The present invention uses ETL data utilities to populate the tables in different databases. "ETL" stands for extract, transform and load. ETL combines three database functions into one tool to pull data out of one database and place it into another database. "Extract" is the process of reading data from a database. "Transform" is the process of converting the extracted data from its previous form into a form that is compatible with the database that is receiving the data (i.e., the "target database"). Transformation is carried out using rules or lookup tables or by combining the data with other data. "Load" is the process of writing the data into the target database. ETL processes enable data to be moved from multiple sources, reformatted and cleansed, and then loaded into another database. In embodiments of the present invention, ETL is also used to migrate data to another operational system to support a business process and to convert databases from one format or type to another.

Figure 1:
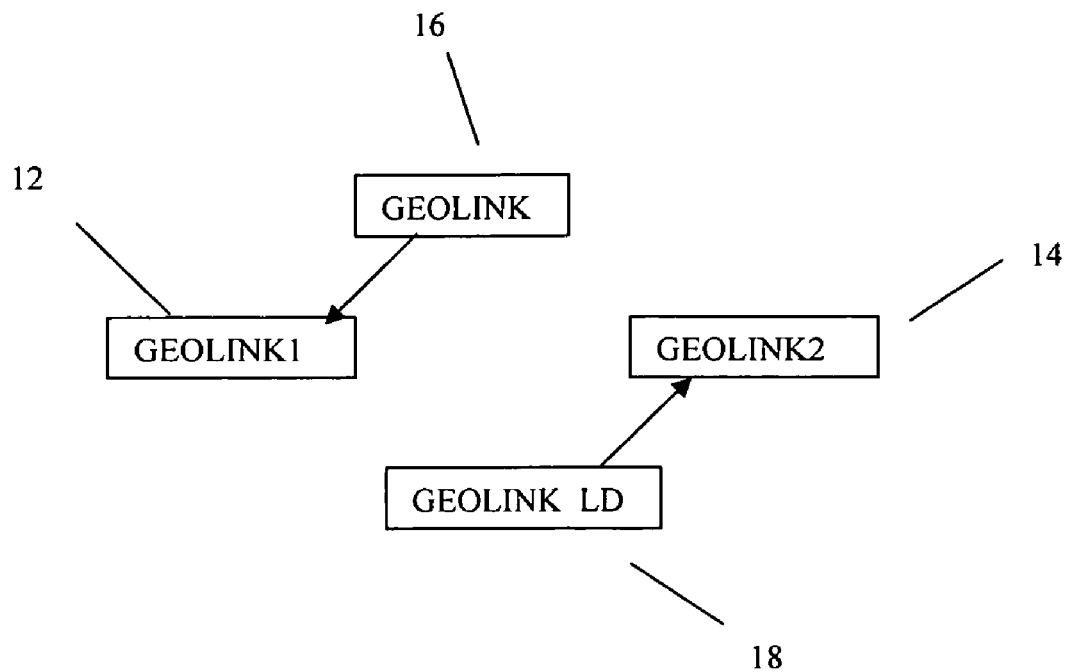
FIG. 1 shows the schema relationships before ETL loading.
Figure 2:
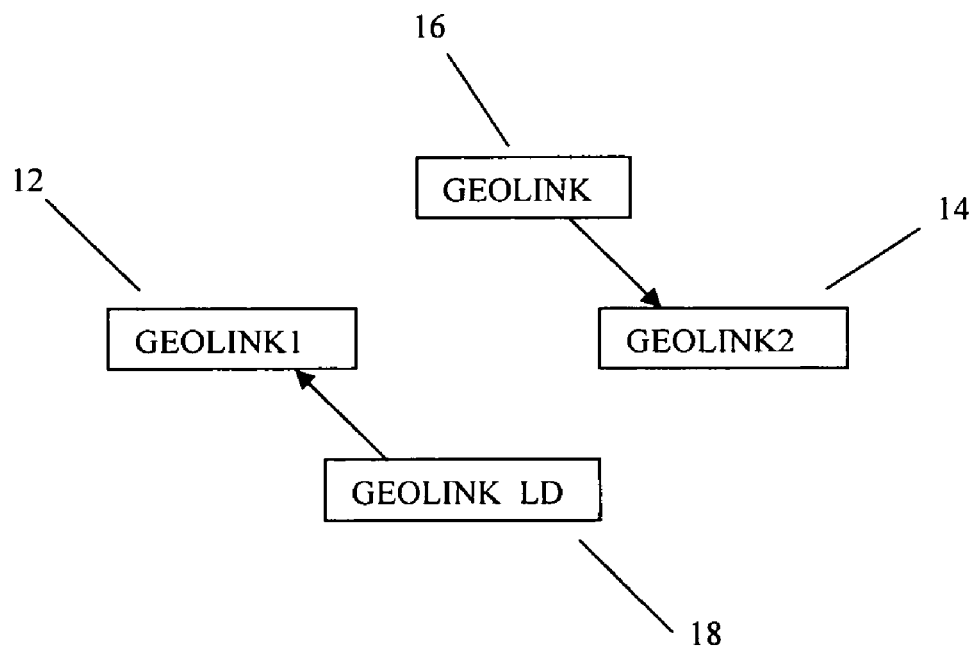
FIG. 2 shows the schema relationships after ETL loading.

The schema flip-flap logic, as shown in FIGS. 1 and 2, is designed for high availability and to minimize the downtime of schema object access so that there is no interference between the user's queries and ETL data loading. In the past, ETL processes were performed during a maintenance downtime, usually at night, when the database was not being accessed. However, this does not fit the 7×24 operational data model required by users. The mechanism of the present invention allows databases to be available to support a 7×24 global operation.

A preferred embodiment of the schema flip-flap method of the present invention includes two user accounts which contain data that can be accessed through a third user account. The third user account contains synonyms that support the notation of schema access to the two data-containing user accounts. The two data containing user accounts are configured so that access to one of the two is available to users on a 7×24 basis and the other data-containing user account is off-line. A fourth user account is provided which contains synonyms that support loading of data into the application schema of the off-line data-containing user account. After the fourth user account completes loading the most recent data into the off-line user account, the third user account can switch user access to the off-line data-containing user account and the other data-containing user account can be taken off-line. When the data-containing user accounts are switched, the synonyms in the third and fourth user accounts are dropped, i.e., they are no longer available and new synonyms have to be created. The switching and updating of the off-line data-containing user account is repeated continuously to provide substantially continuous user access to a data-containing user account.

FIG. 1 shows two data-containing user accounts, where GEOLINK1 12 is on-line and is being accessed by users through user account GEOLINK 16. GEOLINK2 14 is off-line and GEOLINK_LD 18 is loading data into the application schema of GEOLINK2 14. FIG. 2 shows the configuration of the user accounts after the data loading of GEOLINK2 14 is completed and user access has been switched to GEOLINK2 14. GEOLINK1 12 is off-line and GEOLINK 16 provides user access to GEOLINK2. Synonyms for all the tables, views and sequences of the "access target" data-containing user account (i.e., the data-containing user account which is selected for user access) are created in user account GEOLINK 16. These synonyms support user access for read only requests. Synonyms for all the tables of the "ETL target" data-containing user account (i.e., the data-containing user account which is selected for data loading) and synonyms for supporting ETL data loading utilities are provided in GEOLINK_LD 18. These synonyms support the loading of data into the application schema of the off-line data-containing user account.

The flip-flap logic continuously switches the user access between the two data-containing user accounts so that users can access one account while the most recent data is loaded into the application schema of the other account. The switching of user access from GEOLINK1 12 (FIG. 1) to GEOLINK2 14 (FIG. 2) is transparent to the user. The switching operation is almost instantaneous and the user access is not interrupted. In FIG. 2, GEOLINK1 12 is off-line and GEOLINK_LD 18 can download the most recent data into the application schema of GEOLINK1 12. After the loading of GEOLINK1 12 is completed, the user access can be switched to GEOLINK1 12 as shown in FIG. 1. The method of the present invention avoids the need to interrupt user access in order to update the application schema with new data.

Typically, a "schema" is a collection of logical structures of data, or schema objects. A schema is owned by a database user and has the same name as that user. Each user owns a single schema. Schema objects can be created and manipulated with Structured Query Language ("SQL") and include the following types of objects: indexes, packages, stand-alone procedures, sequences, synonyms, tables, database triggers and views. Other types of objects are also stored in the database and can be created and manipulated with SQL, but are not contained in a schema, such objects can be the following: profiles, roles, rollback segments and tablespaces. Names for most types of objects are provided when they are created and must follow rules well known to those skilled in the art and described in "ORACLE7 Server SQL Language Reference Manual."

In terms of the present invention, the schema is the structure (i.e., a group of tables) of a database system, described in a formal language supported by the database management system ("DBMS"). In a relational database, the schema defines the tables, the fields in each table, and the relationships between fields and tables. The method of the present invention copies all of the database tables from the primary schema and creates a secondary schema. The on-line functions that were being performed by the primary schema are then switched to the secondary schema. This is carried out as a transaction in order to maintain schema integrity.

Figure 3:
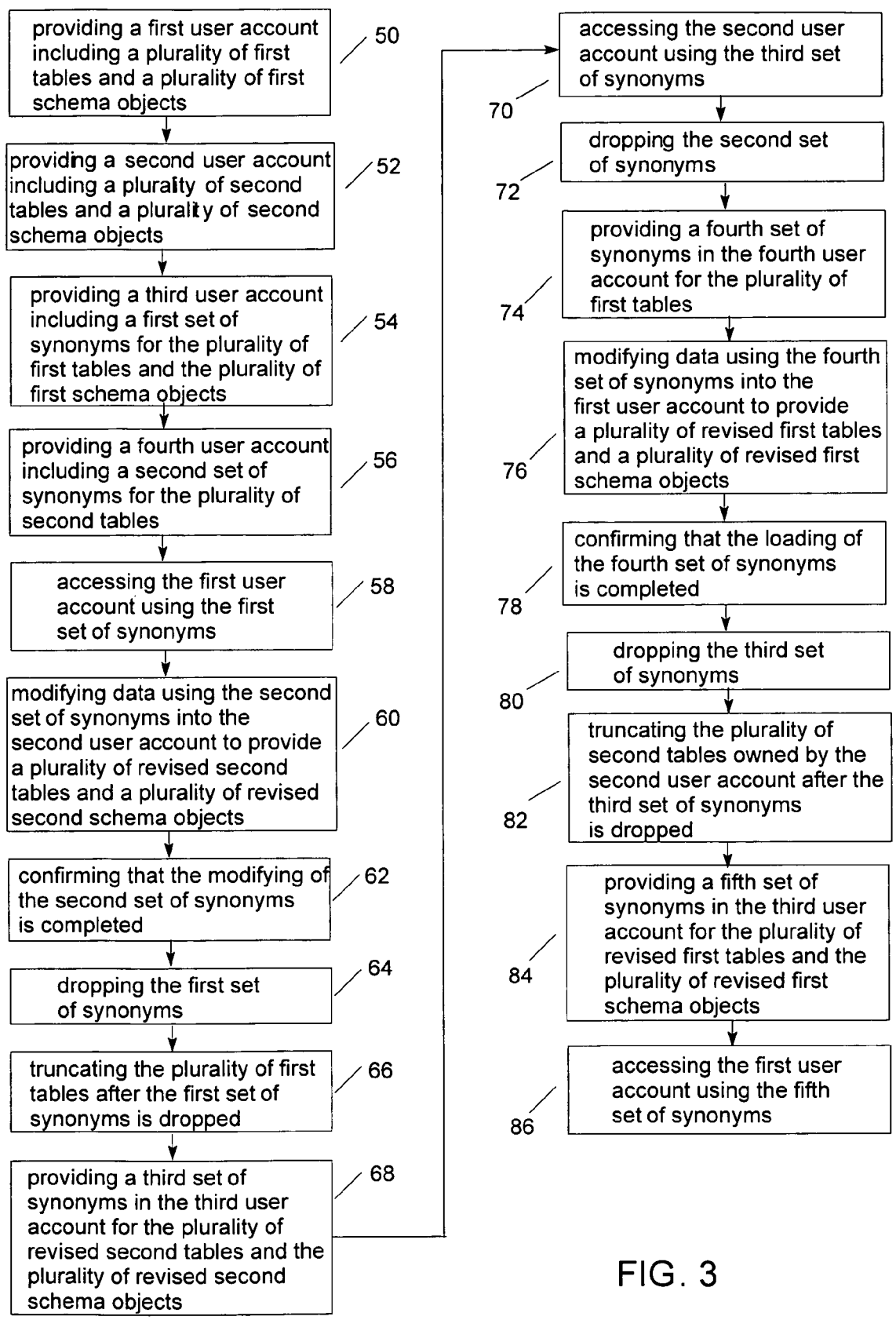
FIG. 3 shows a flowchart of the method in accordance with the present invention.

FIG. 3 is a flow chart of a preferred method for maintaining high availability for an on-line database. The method shown includes the following steps: (1) creating a first user account comprising a plurality of first tables and a plurality of first schema objects in step 50; (2) creating a second user account comprising a plurality of second tables and a plurality of second schema objects in step 52; (3) creating a third user account comprising a first set of synonyms for the plurality of first tables and the plurality of first schema objects in step 54; (4) creating a fourth user account comprising a second set of synonyms for the plurality of second tables in step 56; (5) accessing the first user account using the first set of synonyms in step 58; (6) modifying data using the second set of synonyms into the second user account to provide a plurality of revised second tables and a plurality of revised second schema objects in step 60; (7) confirming that the modifying of the second set of synonyms is completed in step 62; (8) dropping the first set of synonyms in step 64; (9) truncating the plurality of first tables after the first set of synonyms is dropped in step 66; (10) creating a third set of synonyms in the third user account for the plurality of revised second tables and the plurality of revised second schema objects in step 68; (11) accessing the second user account using the third set of synonyms in step 70; (12) dropping the second set of synonyms in step 72; (12) creating a fourth set of synonyms in the fourth user account for the plurality of first tables in step 74; (13) modifying data using the fourth set of synonyms into the first user account to provide a plurality of revised first tables and a plurality of revised first schema objects in step 76; (14) confirming that the modifying of the fourth set of synonyms is completed in step 78; (15) dropping the third set of synonyms in step 80; (165) truncating the plurality of second tables owned by the second user account after the third set of synonyms is dropped in step 82; (17) creating a fifth set of synonyms in the third user account for the plurality of revised first tables and the plurality of revised first schema objects in step 84; and (18) accessing the first user account using the fifth set of synonyms in step 86.

A table in the first user account can be used to track the dropping of the groups of synonyms and provide an historical record of the flip-flap operation. The method for maintaining high availability for an on-line database by using the third user account to provide substantially continuous access to the first user account or the second user account. In addition to tables and schema objects, the first and second user accounts can include views sequences. The groups of schema with odd numbers (i.e., the first, third and fifth set of synonyms) support schema access for user read only queries. The groups of schema with even numbers (i.e., the second and fourth groups of schema) support ETL (extract transform and load) data loading utilities.

The user accounts can be located in one or more databases, preferably in one or more on-line analytical processing databases. In a preferred embodiment of the invention, each of the first, second, third and fourth user accounts is located in one or more databases. In another preferred embodiment, the first user account is in a first group of one or more databases and the second user account is in a second group of one or more databases.

EXAMPLE

The examples set forth below serve to provide further appreciation of the invention but are not meant in any way to restrict the scope of the invention.

Example 1

The following example briefly outlines the functionality and implementation of the flip-flap mechanism used in the present invention. Corresponding to each application schema for the application schema GEOLINK, four Oracle user accounts are provided in the database. These accounts are: GEOLINK1 12; GEOLINK2 14; GEOLINK 16; and GEOLINK_LD 18. FIGS. 1 and 2 show the changes before and after the ETL utility loads data into application schema GEOLINK.

GEOLINK1 12 and GEOLINK2 14 host real schema objects. GEOLINK 16 and GEOLINK_LD 18 host synonyms, which refer to schema objects in either GEOLINK1 12 or GEOLINK2 14, depending on the schema flip-flap logic employed. Initially, GEOLINK1 12 holds all schema objects with data, and GEOLINK2 14 holds all schema objects without data. After the database is initialized and is in operation, both GEOLINK1 12 and GEOLINK2 14 hold all schema objects with data.

A first set of synonyms is provided in GEOLINK 16 for all tables, views and sequences owned by GEOLINK1 12. The synonyms in GEOLINK support the notation of schema access for user "read only" queries of the database (i.e., GEOLINK.<OBJECT_NAME> in user GEOLINK_RO's queries). The synonyms direct the user requests to locations in the data-containing user account.

A second set of synonyms is provided in GEOLINK_LD 18 for all tables owned by GEOLINK2 14. The synonyms in GEOLINK_LD 18 support ETL data loading utilities, which use the synonyms to populate the tables owned by GEOLINK2 14. FIG. 1 shows the GEOLINK configuration before ETL loading and FIG. 2 shows the GEOLINK configuration after ETL loading.

After it is verified that the ETL utility loading data into a particular application schema (either GEOLINK1 12 or GEOLINK2 14) using the GEOLINK_LD 18 is completed, the synonyms in GEOLINK 16 are dropped and new synonyms are provided in GEOLINK 16 for all tables, views and sequences owned by GEOLINK2 14. This allows user access to GEOLINK2 14 through GEOLINK 16. Likewise, the synonyms in GEOLINK_LD 18 are also dropped and new synonyms are provided in GEOLINK_LD 18 for all tables owned by GEOLINK1 12. In addition, all the tables owned by GEOLINK1 12 are truncated so that they are once again ready for data loading. GEOLINK and GEOLINK_LD 18 exchange (or "flip-flap") the synonyms between GEOLINK1 12 and GEOLINK2 14 after it is confirmed that data has been successfully loaded into a schema.

In order to maintain schema integrity, the implementation of the aforementioned schema flip-flap is carried out as a transaction. If the ETL utility fails to load data, the schema flip-flap will not occur. The schema name table (GEOLINK_NAME) in the database is used to keep track of the status of schema flip-flap transactions. If a schema flip-flap is successful, then the table is updated; otherwise, the table is not updated.

There are two shell (i.e., user interface) scripts that can be used for implementing the schema flip-flap logic. The two scripts are "SetENV.sh" and "setSYN.sh" and they and can be found under $ORACLE_BASE/admin/$ORACLE_SID/create directory. The SetENV.sh script can be used to check to see which schema the GEOLINK or GEOLINK_LD currently refers to. This script takes one argument, which is a schema name. The syntax of running this script is "$. setENV.sh GEOLINK." Where GEOLINK is a sample schema name. (Note that the capital letters must be used here.)

The setSYN.sh script can also be used to implement the schema flip-flap logic. After an ETL loading is successfully completed, this script must be invoked to drop/re-create synonyms for GEOLINK and GEOLINK_LD, and to update the GEOLINK_NAME table in the database in order to complete a transaction. This script takes one argument, which is a schema name. The syntax of executing this script is "$. setSYN.sh GEOLINK." Where GEOLINK is a sample schema name, and note that it must be capitalized here.

Thus, while there have been described the preferred embodiments of the present invention, those skilled in the art will realize that other embodiments can be made without departing from the spirit of the invention, and it is intended to include all such further modifications and changes as come within the true scope of the claims set forth herein.

We claim:

1. A method for maintaining high availability for an on-line database comprising:
   providing access to data in a first user account using a first set of synonyms;
   modifying data in a second user account using a second set of synonyms;
   generating a third set of synonyms associated with the second user account;
   dropping the first set of synonyms;
   providing access to data in the second user account using the third set of synonyms;
   dropping the second set of synonyms;
   generating a fourth set of synonyms associated with the first user account; and
   modifying data in the first user account using the fourth set of synonyms,
   wherein the data in the first user account represents a different version of the data in the second user account.

2. The method for maintaining high availability for an on-line database according to claim 1, wherein the first set of synonyms and third set of synonyms support schema access for user read only queries and wherein the second set of synonyms and the fourth set of synonyms support ETL (extract transform and load) data loading utilities.

3. A method for maintaining high availability for an on-line database comprising:
   providing a first user account comprising a plurality of first tables and a plurality of first schema objects;
   providing a second user account comprising a plurality of second tables and a plurality of second schema objects;
   providing a third user account comprising a first set of synonyms for the plurality of first tables and the plurality of first schema objects;
   providing a fourth user account comprising a second set of synonyms for the plurality of second tables;
   accessing the first user account using the first set of synonyms;
   modifying data using the second set of synonyms into the second user account to provide a plurality of revised second tables and a plurality of revised second schema objects;
   dropping the first set of synonyms;
   providing a third set of synonyms in the third user account for the plurality of revised second tables and the plurality of revised second schema objects; and
   accessing the second user account using the third set of synonyms.

4. The method for maintaining high availability for an on-line database according to claim 3, further comprising truncating the plurality of first tables owned by the first user account after the first set of synonyms is dropped.

5. The method for maintaining high availability for an on-line database according to claim 3, further comprising:
   dropping the second set of synonyms; and
   providing a fourth set of synonyms in the fourth user account for the plurality of first tables.

6. The method for maintaining high availability for an on-line database according to claim 5, further comprising:
   modifying data using the fourth set of synonyms into the first user account to provide a plurality of revised first tables and a plurality of revised first schema objects;
   dropping the third set of synonyms;
   providing a fifth set of synonyms in the third user account for the plurality of revised first tables and the plurality of revised first schema objects; and
   accessing the first user account using the fifth set of synonyms.

7. The method for maintaining high availability for an on-line database according to claim 6, wherein a table in the first user account tracks the dropping of groups of synonyms.

8. The method for maintaining high availability for an on-line database according to claim 5, further comprising:
   confirming that the data modifying using the fourth set of synonyms is completed before accessing the first user account using the fifth set of synonyms; and
   truncating the plurality of second tables after the third set of synonyms is dropped.

9. The method for maintaining high availability for an on-line database according to claim 3, further comprising confirming that the data modifying using the second set of synonyms is completed before accessing the second user account using the third set of synonyms.

10. The method for maintaining high availability for an on-line database according to claim 3, wherein the third user account provides substantially continuous access to the first user account or the second user account.

11. The method for maintaining high availability for an on-line database according to claim 3, wherein the first user account further comprises a plurality of first views and a plurality of first sequences and the second user account further comprises a plurality of second views and a plurality of second sequences.

12. The method for maintaining high availability for an on-line database according to claim 3, wherein the first set of synonyms and third set of synonyms support schema access for user read only queries.

13. The method for maintaining high availability for an on-line database according to claim 3, wherein the second set of synonyms supports ETL (extract transform and load) data loading utilities.

14. The method for maintaining high availability for an on-line database according to claim 3, wherein the user accounts are in one or more databases.

15. The method for maintaining high availability for an on-line database according to claim 3, wherein the user accounts are in one or more on-line analytical processing databases.

16. The method for maintaining high availability for an on-line database according to claim 3, wherein each of the first, second, third and fourth user accounts is in one or more databases.

17. The method for maintaining high availability for an on-line database according to claim 3, wherein first user account is in a first group of one or more databases and the second user account is in a second group of one or more databases.

18. A method for maintaining high availability for an on-line database comprising:
    providing a first user account comprising a plurality of first tables and a plurality of first schema objects;
    providing a second user account comprising a plurality of second tables and a plurality of second schema objects;
    providing a third user account comprising a first set of synonyms for the plurality of first tables and the plurality of first schema objects;
    providing a fourth user account comprising a second set of synonyms for the plurality of second tables;
    accessing the first user account using the first set of synonyms;
    modifying data using the second set of synonyms into the second user account to provide a plurality of revised second tables and a plurality of revised second schema objects;
    dropping the first set of synonyms;
    truncating the plurality of first tables after the first set of synonyms is dropped;
    providing a third set of synonyms in the third user account for the plurality of revised second tables and the plurality of revised second schema objects;
    accessing the second user account using the third set of synonyms;
    dropping the second set of synonyms; and
    providing a fourth set of synonyms in the fourth user account for the plurality of first tables,
    wherein the first set of synonyms and the third set of synonyms support schema access for user read only queries, wherein the second set of synonyms supports ETL (extract transform and load) data loading utilities, and wherein the user accounts are in one or more databases.

19. The method for maintaining high availability for an on-line database according to claim 18, wherein a table in the first user account tracks the dropping of groups of synonyms and wherein the third user account provides substantially continuous access to the first user account or the second user account.

20. The method for maintaining high availability for an on-line database according to claim 18, wherein the first user account further comprises a plurality of first views and a plurality of first sequences and the second user account further comprises a plurality of second views and a plurality of second sequences.

* * * * *